United States Patent

Birk et al.

Patent Number: 5,994,867
Date of Patent: Nov. 30, 1999

[54] METHOD AND DEVICE FOR CONTROLLING A SENSORLESS FIELD-ORIENTED ASYNCHRONOUS MACHINE

[75] Inventors: Gunther Birk, Erlangen; Eugen Holl, Langenzenn, both of Germany

[73] Assignee: Siemens Aktiengesellschaft, Munich, Germany

[21] Appl. No.: 09/093,112

[22] Filed: Jun. 8, 1998

[30] Foreign Application Priority Data

Jun. 12, 1997 [DE] Germany ............. 197 24 946

[51] Int. Cl.⁶ .................................. G05B 11/36
[52] U.S. Cl. .......................... 318/609; 318/803
[58] Field of Search ............ 318/800–811, 609, 318/610, 560

[56] References Cited

U.S. PATENT DOCUMENTS

| | | | |
|---|---|---|---|
| 4,441,065 | 4/1984 | Bayer et al. | 318/808 |
| 4,447,787 | 5/1984 | Schwesig et al. | 318/803 |
| 4,503,375 | 3/1985 | Okuyama | 318/802 |
| 4,593,240 | 6/1986 | Blaschke | 318/803 |
| 4,626,761 | 12/1986 | Blaschke | 318/803 |
| 4,763,058 | 8/1988 | Heining et al. | 318/807 |
| 4,764,712 | 8/1988 | Blaschke et al. | 318/805 |

FOREIGN PATENT DOCUMENTS

| | | |
|---|---|---|
| 0 633 653 | 1/1995 | European Pat. Off. |
| 3 144 188 | 6/1982 | Germany . |
| 208 438 | 5/1984 | Germany . |
| WO 95/03649 | 2/1995 | WIPO . |

OTHER PUBLICATIONS

W. Zimmerman, "High–Dynamic AC Machine Control without Spped or Position Sensor," Jan./Feb. 1997, ETEP, vol. 6, No. 1, pp. 47–51.

Dr. F. Blaschke, "Regelverfahren für Drehfeldmaschinen," VDI Bildungswerk, May 13, 1976, pp. 1–19. An English translation is provided.

von F. Blaschke, "Feldorientierjung der geberlosen Drehfeldmaschine," [Field–orientation for Sensorless Rotating Field Machines], etz, Issue 21, 1995, pp. 14–23. Described in the specification of the above–identified application.

Primary Examiner—William M. Shoop, Jr.
Assistant Examiner—Rina I. Duda
Attorney, Agent, or Firm—Kenyon & Kenyon

[57] ABSTRACT

A method and a device for controlling a sensorless, field-oriented asynchronous machine, wherein a manipulated variable space vector and a stator frequency are calculated, by means of a two-component current control system, from which control signals are generated using a space vector modulation process. A PI controller of an EMF control system for the d-component of a calculated EMR space vector of the field-oriented control system is deactivated and its output signal set to zero at a stator frequency, determined as a function of a calculated d-component of a calculated EMF space vector and a calculated stator frequency, that is less than or equal to a first limit frequency. Thus, the method may be used for speed control of a sensorless, field-oriented asynchronous machine down to a full stop.

12 Claims, 5 Drawing Sheets

METHOD AND DEVICE FOR CONTROLLING A SENSORLESS FIELD-ORIENTED ASYNCHRONOUS MACHINE

FIELD OF THE INVENTION

The present invention relates to a method and a device for controlling a sensorless, field-oriented asynchronous machine.

BACKGROUND INFORMATION

International Application No. WO 9503649 describes a two-component current controller with a space vector modulator for an induction machine supplied by a pulse-controlled inverter. This field-oriented control system includes an input transformer system, an EMF computer, a pre-control network, a current control circuit, an active current controller, and an output-side coordinate converter. The input-side transformer is supplied with two measured phase currents from which orthogonal field-oriented actual current components are generated using a flux angle. These actual current components are sent both to the current control circuit and to the EMF computer. The EMF computer also receives the setpoint voltage components, the parameters of the induction machine (stator resistance $R_s$ and leakage inductance $L_o$), and the stator frequency $\omega_s$. The output of the EMF computer is coupled with the actual-value input of the active current controller, so that a field-oriented, torque-forming setpoint current component appears at the setpoint-value input of this control system. The output signal of this active current control system is used as a speed-correction for a calculated slip frequency, which is added to a measured actual rpm value to form the stator frequency. The current-control circuit contains a comparator with a downstream controller for each field-oriented current component, so that an output signal of the input-side transformer exists at each inverting input, and a field-oriented setpoint current component exists at each non-inverting input. The outputs of this current-control circuit are connected to the outputs of the pre-control network; the setpoint current values, the "stator resistance," "leakage inductance," and "magnetizing inductance" parameters are fed to the input of the pre-control network. The sum signal, consisting of field-oriented pre-control values and controller manipulated variables, also known as field-oriented manipulated variables, is fed to the output-side coordinate converter, which converts these orthogonal components into polar components. These polar manipulated variable components, also called voltage components, and the stator frequency are fed to the space vector modulator, at whose outputs control signals for the pulse-controlled inverter are formed.

For this field-oriented control system with a sensor, active current control is used to correct the slip frequency and to adjust parameters (rotor resistance). The slip frequency is calculated from the torque-forming setpoint current component and a quotient of the rotor resistance and setpoint flux. These two signals are multiplied, and the product is equal to the slip frequency. Since the "rotor resistance" parameter is temperature-dependent, the slip frequency changes in proportion to the "rotor resistance" parameter. Using this active current control method, the correct slip frequency may be determined, allowing maximum torque to be developed.

This control structure has also proved effective for a sensorless induction machine. In a field-oriented controller system without a sensor, an EMF control system is used instead of active current control. The actual input value of the EMF system is coupled with a d-component output of an EMF computer of the field-oriented control system. The integral portion of the PI controller for this EMF control system represents the rotational speed, including the slip frequency correction. The absolute value of slip frequency correction is practically negligible at lower speeds. In this manner, the EMF control system delivers a good estimated value for the speed at medium and higher speeds.

The EMF computer, which computes an EMF actual space vector as a function of the actual current component, the setpoint voltage component, and the machine parameters uses the so-called "voltage model." Since this voltage model is very inaccurate at low frequencies because of the low absolute value of the motor voltage, field-oriented operation at speeds approaching zero is not easily accomplished. At zero frequency, this process is no longer useable. In particular, reversing without undesired changes in torque is very difficult. Also, strategies for starting up from rest, and for decelerating to rest, must be found.

There are various conventional methods of implementing sensorless operation of asynchronous machines. At medium and higher speeds, sensorless operation using the conventional methods of field-oriented control may be used satisfactorily. There are various approaches for lower frequencies.

A method for sensorless field-orientation of rotating-field machines down to frequency zero is described in the article "Feldorientierung der geberlosen Drehfeldmaschine," (Field-orientation for sensorless rotating-field machines) which appeared in the German periodical "etz", issue 21, 1995, pages 14–23. In this method, dynamic current signals are injected into the flux-forming current component of the stator current. This injection has little dynamic influence on the torque produced. In stationary operation, the model works perfectly. The effect of this excitation is evaluated in the measured machine voltages and currents. The position of the rotor flux axis may be estimated using the saturation characteristics of the rotor leakage, which assures field-orientation. This procedure must be replaced by an appropriate field-oriented control system in the upper rotational speed ranges, since it can only be used in the saturation range of the rotor leakage, and it also requires a sufficient voltage reserve to supply the test signal. The machine used must have a distinct rotor current saturation characteristic. The implementation of this method is very expensive and computation-intensive because of the required vector transformation.

The article "High-dynamic AC machine control without speed or position sensor," ETEP, vol. 6, #1, January–February 1996, pp. 47–51, describes a method in which the voltage model of the machine is supported by the current model at low frequencies. The dynamics of this model are limited by the rotor time constant of the machine. Additionally, the current model does not produce the proper flux angle necessary for orientation, but rather only the rotor flux amplitude. Because of this, it is suitable, for this application, only as an observer of parameter compliance for the voltage model. Using this method, it is possible, in principle, to approach zero rpm and eliminate the effects of thermally-caused fluctuations in the stator resistance.

SUMMARY OF THE INVENTION

An object of the present invention is to provide a method and a device for controlling a sensorless, field-oriented asynchronous machine allowing it to decelerate down to zero rotational speed.

Another object of the present invention is to start the sensorless, field-oriented asynchronous machine up from zero rotational speed.

Additionally, the method in accordance with the present invention may be expandable so as to make reversing possible without undesired changes in torque.

Based on a field-oriented control with an EMF control system and a pre-control system, the PI controller of an EMF control system is deactivated, and its output signal gradually set to zero at a stator frequency of less than or equal to a first limit frequency, determined as a function of a calculated d-component of a calculated space vector and a calculated slip frequency. The value of the first limit frequency is much smaller than the nominal slip of the sensorless, field-oriented asynchronous machine. At stator frequencies less than or equal to this first limit frequency, operation takes place with very small setpoint torque values, which corresponds to a breakaway torque of a drive configuration where no noticeable loss is detectable as a result of the deactivation of the EMF control system with delayed setting to zero of its integral component.

In an advantageous method according to the present invention, the output signal of the EMF control system for a calculated stator frequency greater than the first limit frequency is limited to zero from one direction as a function of a setpoint rotational direction. In this manner, only positive estimated values (output signals) of the PI controller of the EMF control system are forwarded to calculate the stator frequency for a positive setpoint rotational direction. Thus, malfunction of the EMF control system is prevented in the range of inaccurate voltage calculation.

The dynamics of the PI controller of the EMF control system, and therefore the estimated speed value, are limited because of the gain that can be achieved. When the machine is operating under load, the dynamics are completely sufficient. They are determined by the resulting moment of inertia at the motor output (moments of inertia of the transmission, slope, drive mass, etc.).

In another advantageous method according to the present invention, in order to prevent gross errors in orientation in the event of load shedding due to insufficient dynamics of the PI controller of the EMF control system, the torque-forming setpoint current component is limited as a function of a calculated deviation of an actual acceleration value from a setpoint acceleration value. This value may be so selected that the acceleration limitation only is effective at other than regular operating points.

The above-described method allows proper startup and operation over the entire speed range. During braking operations in motor vehicles, the braking torque is reduced to zero as a function of the rotational speed until the vehicle comes to rest in order to assure a smooth stop. In this manner, the method in accordance with the present invention may also be used for this application.

During a dynamic direction of rotation reversal (reversing during operation), the stator frequency zero crossing must be controlled with a given torque. Using the above-described method, this operation cannot be performed satisfactorily.

The object of reversing without undesired changes in torque may be achieved in accordance with the present invention in that, with the previously described field-oriented control in reversing the setpoint direction of revolution starting from a second limit frequency whose value is greater than the value of the first limit frequency, the speed point zero is crossed in a controlled manner, so that the model speed is modified as a function of the actual acceleration value determined at the second limit frequency.

Due to the fact that the EMF control PI controller output signal of the EMF control system is controlled within the rpm range between the positive and negative values of the second limit frequency as a function of the actual acceleration value determined at the time when this limiting frequency is reached, the stator frequency passes through zero rpm controlled with a given torque.

In an advantageous method according to the present invention, changes in the setpoint values of the torque selection are converted into equivalent actual acceleration values during the controlled zero crossing. In this manner, changes in torque may also be made during this operation.

DETAILED DESCRIPTION

Figure 1:
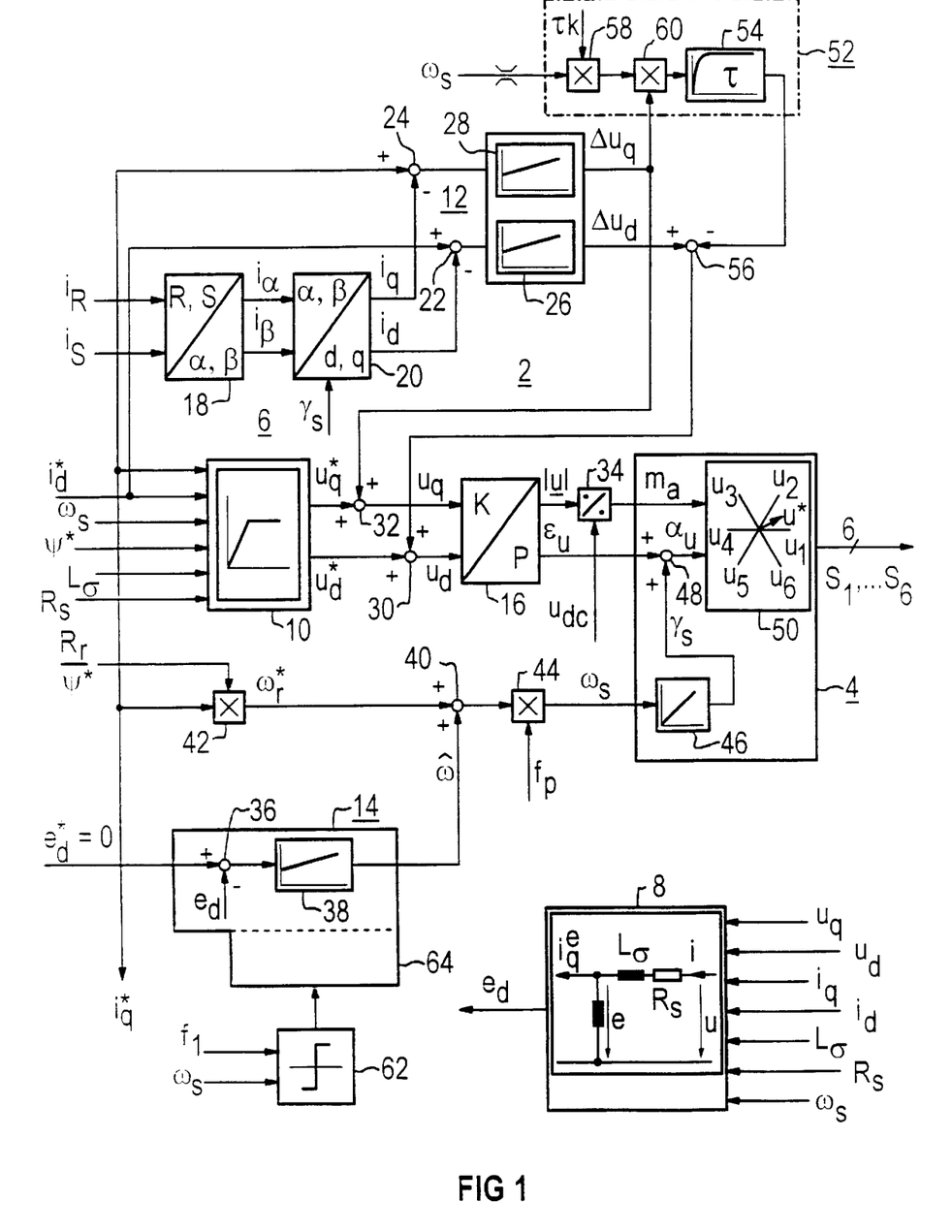
FIG. 1 shows a block circuit diagram of a first embodiment of the device to accomplish speed control in accordance with the present invention.

FIG. 1 shows a block circuit diagram of a device for carrying out the method according to the present invention for control of a sensorless, field-oriented asynchronous machine. This device includes a space vector modulator 4 and a field-oriented control system 2 which includes an input-side transformer 6, an EMF computer 8, a pre-control network 10, a current control circuit 12, an EMF control system 14, and an output-side coordinate converter 16. The measured phase currents $i_R$ and $i_S$ are transformed into flux- and torque-forming actual current components $i_d$ and $i_q$ by means of the input-side transformer 6, which contains a coordinate converter 18 and a vector rotator 20, and a calculated flux position $\gamma_S$. These actual current components $i_d$ and $i_q$ are each passed to a comparator 22 and 24 in the current control circuit 12, at whose non-inverting inputs setpoint current components $i^*_d$ and $i^*_q$ are formed. At the output, comparators 22, 24 are coupled with current controllers 26, 28, whose outputs are connected to adders 30, 32, respectively. These current controllers 26, 28 are supported by the pre-control network 10 in that the pre-control network 10 calculates pre-control values $u^*_d$ and $u^*_q$ as a function of the setpoint current components $i^*_d$ and $i^*_q$, and parameters of the asynchronous machine (stator resistance $R_s$, leakage inductance $L_\sigma$, a calculated stator frequency $\omega_S$, and a setpoint flux $\Psi^*$). These pre-control values $u^*_d$ and $u^*_q$ are each sent to the corresponding adders 30 and 32. In this manner, current controllers 26 and 28 now deliver voltages $\Delta u_d$ and $\Delta u_q$, also known as controller manipulated variables which are not calculated by pre-control network 10 (such as, e.g., dynamic components, faults, etc.). The outputs of the two adders 30 and 32 are passed to the output-side coordinate converter 16. Using this coordinate converter 16, orthogonal components $u_d$ and $u_q$ of the manipulated variable space vector u are converted into polar components |u| and $\epsilon_u$. The absolute value component |u| is normalized using a divider 34 at whose second input there is an input value $u_{dc}$ of the pulse-controlled inverter. The output value $m_a$ of divider 34 is the control value of the pulse-controlled inverter. Divider 34 may also be a component of space vector modulator 4. Orthogonal manipulated variable components $u_d$ and $u_q$ and the actual current components $i_d$ and $i_q$ are supplied to the EMF computer 8, to which the machine parameters stator resistance $R_s$, leakage inductance $L_o$, and calculated stator frequency $\omega_s$ are also supplied. At the output of EMF computer 8 there is a d-component $e_d$ of an EMF space vector e. Since only one component $e_d$ exists in the q-axis of the d- and q-coordinate system rotating with stator frequency $\omega_s$ for a correct field orientation of EMF space vector e, the d-component $e_d$ must equal 0. This d-component $e_d$ is supplied to the EMF control system 14, at whose second input the setpoint d-component $e'_d$ is present, which is equal to 0. This EMF control system 14 includes a comparator 36 and a PI controller 38.

In this field-oriented controller 2 without a sensor, the imaginary component of PI controller 38 of EMF control system 14 forms an estimated value $\hat{\omega}$ of the speed of the asynchronous motor. This estimated value $\hat{\omega}$ is added to a calculated slip frequency setpoint value $\omega^*_r$ from an adder 40. This calculated slip frequency setpoint value $\omega^*_r$ is present at the output of a multiplier 42, at whose inputs a torque-forming setpoint current component $i^*_q$ and a quotient from rotor resistance $R_r$ and setpoint flux $\Psi^*$ are present. Stator frequency $\omega_s$ is obtained from the sum of this calculated slip frequency setpoint value $\omega^*_r$ and estimated value $\hat{\omega}$ inputted to a multiplier 44, at whose second input the number of pairs of poles $f_p$ of the motor appears; whereby the conversion of the mechanical speed to the electrical stator frequency $\omega_s$ is produced.

This stator frequency $\omega_s$ is also supplied to space vector modulator 4. This space vector modulator 4 includes an angular integrator 46, an adder 48, and an arithmetic unit 50. By means of angular integrator 46 and stator frequency $\omega_s$, flux angle $\gamma_s$ is obtained in the stator-oriented coordinate system which is added to the position $\epsilon_u$ of manipulated variable space vector u in the flux-oriented coordinate system. The sum of these two angles $\gamma_s$ and $\epsilon_u$ is the position $\alpha_u$ of the manipulated variable space vector u in the stator-oriented coordinate system. The control signals $S_1 \ldots S_6$ for the pulse-controlled inverter are obtained from the signals $m_a$ (control value) and $\alpha_u$ (position of the manipulated variable space vector u).

The above-described field-oriented control system 2 for an induction machine is described in the aforementioned International Application No. WO 95/03649. The control method performed using the field-oriented control system 2 is the two-component current control method. International Application No. WO 95/03649 makes a reference to an arithmetic unit 50 and a pre-control network 10, which is also known as a decoupling network.

This two-component current controller is expanded to include a shunt arm 52 which adds controller manipulated variable $\Delta u_q$ of current controller 20 to the controller manipulated variable $\Delta u_d$ of current controller 26 by means of an adder 56 through a delaying mechanism 54. Multipliers 58, 60 are connected in series to each of the inputs of shunt arm 52; coefficients $\tau$ and k appear at the second input of the first multiplier 58, and the frequency value of the first multiplier 58 appears at the second input of the second multiplier 60; the output of second multiplier 60 is connected to delaying mechanism 54. By introducing this shunt arm, the output of current controller 28 does not only change the effective voltage (as in the case of two-component current control), but also causes the voltage vector to rotate by changing the reactance voltage (as in the case of effective current control). At the same time, shunt arm 52 also causes a situation in which a change in the controller manipulated variable $\Delta u_q$ does not affect the reactive voltage; i.e., the control circuits are decoupled. Thus, the slow compensating processes typical of the two-component control system with a detuned pre-control network 10 no longer occur. For ideal decoupling, the time constant $\tau$ of the delaying mechanism 54 must be selected to be equal to the short-circuit time constant of the motor, and the gain k must be changed proportionally to the stator frequency. This shunt arm 52 is described in detail in European Patent No. 0 633 653 A1, so that it will not be explained in more detail here.

This field-oriented control system 2 features another comparator 62 whose output is coupled with a device 64 which deactivates PI controller 38 of EMF control system 14 and reduces the integral component of this PI controller 38 to zero with a delay. This device 64 is a component of EMF control system 14. The inputs of comparator 62 receive a first limit frequency $f_1$ and calculated stator frequency $\omega_s$. As soon as stator frequency $\omega_s$ becomes less than or equal to the first limit frequency $f_1$, device 64 is activated. This device 64 deactivates PI controller 38 of EMF control system 14, and sets its integral component to zero with a delay. In this manner, the estimated value $\hat{\omega}$ and thus the stator frequency $\omega_s$ slowly drop to zero. A value considerably less than setpoint slip frequency $\omega^*_{rn}$ ($f_1 \leq 30\% \omega^*_{rn}$) is set as the first limit frequency $f_1$.

By means of this expansion of the field-oriented control 2 of a sensorless, field-oriented asynchronous machine, this asynchronous machine may be decelerated gradually to zero rpm. Additionally, this asynchronous machine can start up from zero rpm. When starting up from zero up to the first limit frequency $f_1$, EMF control system 14 is blocked, so that the stator frequency $\omega_s$ is equal to the calculated slip frequency $\omega^*_r$. When the first limit frequency $f_1$ is exceeded, device 64 is again deactivated, so that the PI controller 38 of the EMF control system 14 becomes active again.

Figure 2:
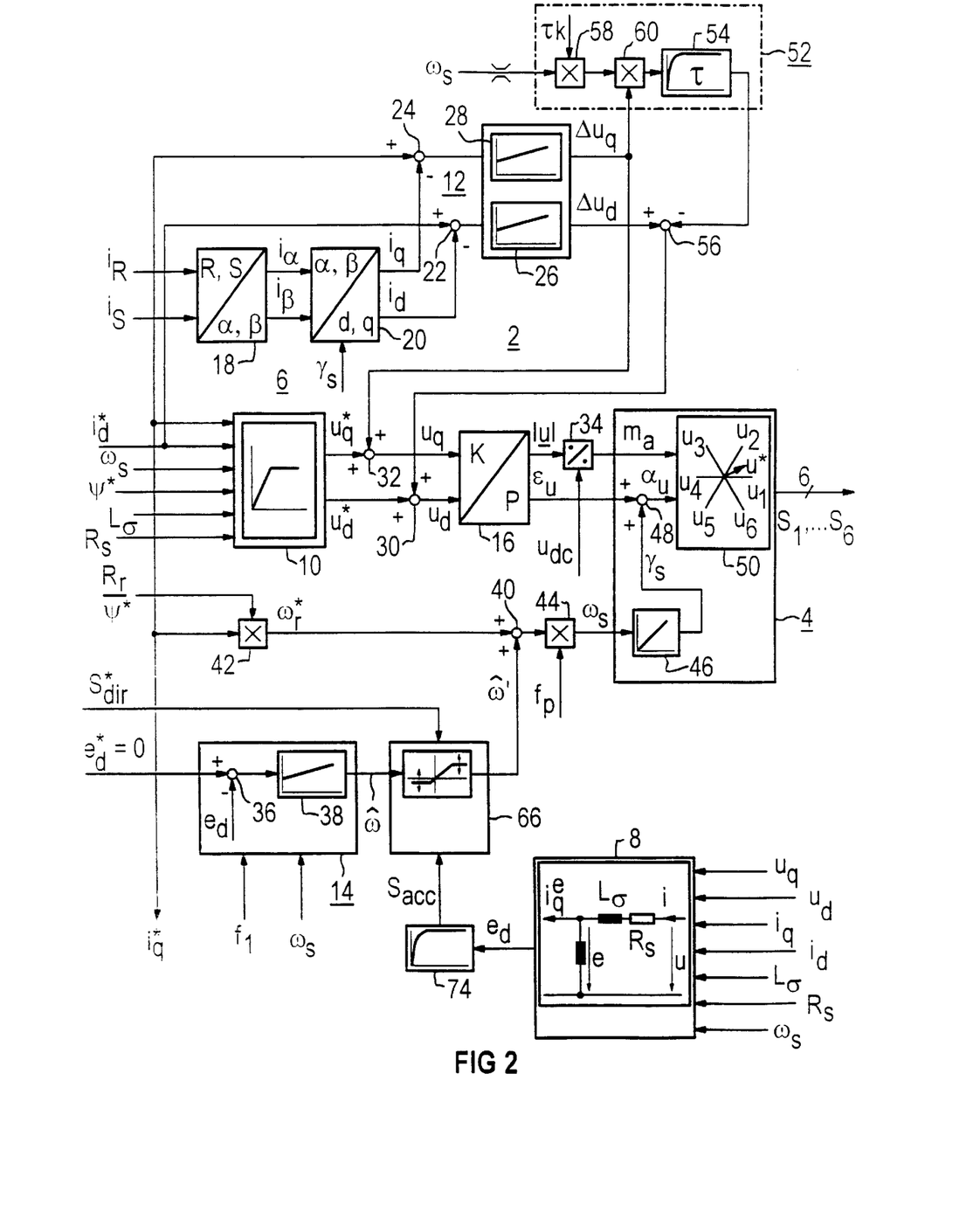
FIG. 2 shows a diagram of a second embodiment of the device to accomplish speed control in accordance with the present invention.

FIG. 2 shows a block circuit diagram of a second embodiment of the device for carrying out the procedure according to the present invention to control a sensorless, field-oriented asynchronous machine. This embodiment differs from the embodiment in FIG. 1 in that a device 66 to limit the output signal $\hat{\omega}$ of PI controller 38 of EMF control system 14 is connected downstream from EMF control system 14. This device 66 is also supplied with a setpoint rotating direction $S^*_{dir}$. Furthermore, an additional input of this device 66 is connected to an output of a converter 74, whose input is connected to a d-output of EMF computer 8. At the output of this converter 74, an actual acceleration value $S_{acc}$ arises which is determined from the d-component of a calculated EMF space vector e. For reasons of clarity, comparator 62 and device 64, which are preferably components of the EMF control system 14, are not explicitly illustrated. By means of device 66, the estimated value $\hat{\omega}$ of EMF control system 14 is limited to zero from one direction. The estimated value $\hat{\omega}$ that is limited depends on the setpoint rotational direction $S^*_{dir}$. For a positive setpoint rotational direction $S^*_{dir}$, only positive values of the estimated value $\omega$ are forwarded. In this manner it is achieved that, after PI controller 38 of EMF control system 14 is active again, errors in EMF control 14 resulting from the still inaccurate voltage calculation are not used to determine stator frequency $\omega_s$.

The dynamics of PI controller 38 of EMF control system 14, and therefore the estimated value $\hat{\omega}$, are limited because of the gain that can be achieved. When the asynchronous machine is under load, the dynamics of this EMF control system 14 is sufficient, and determined by the resulting moment of inertia at the motor output (moments of inertia of the transmission, grade, vehicle mass, etc.).

Figure 3:
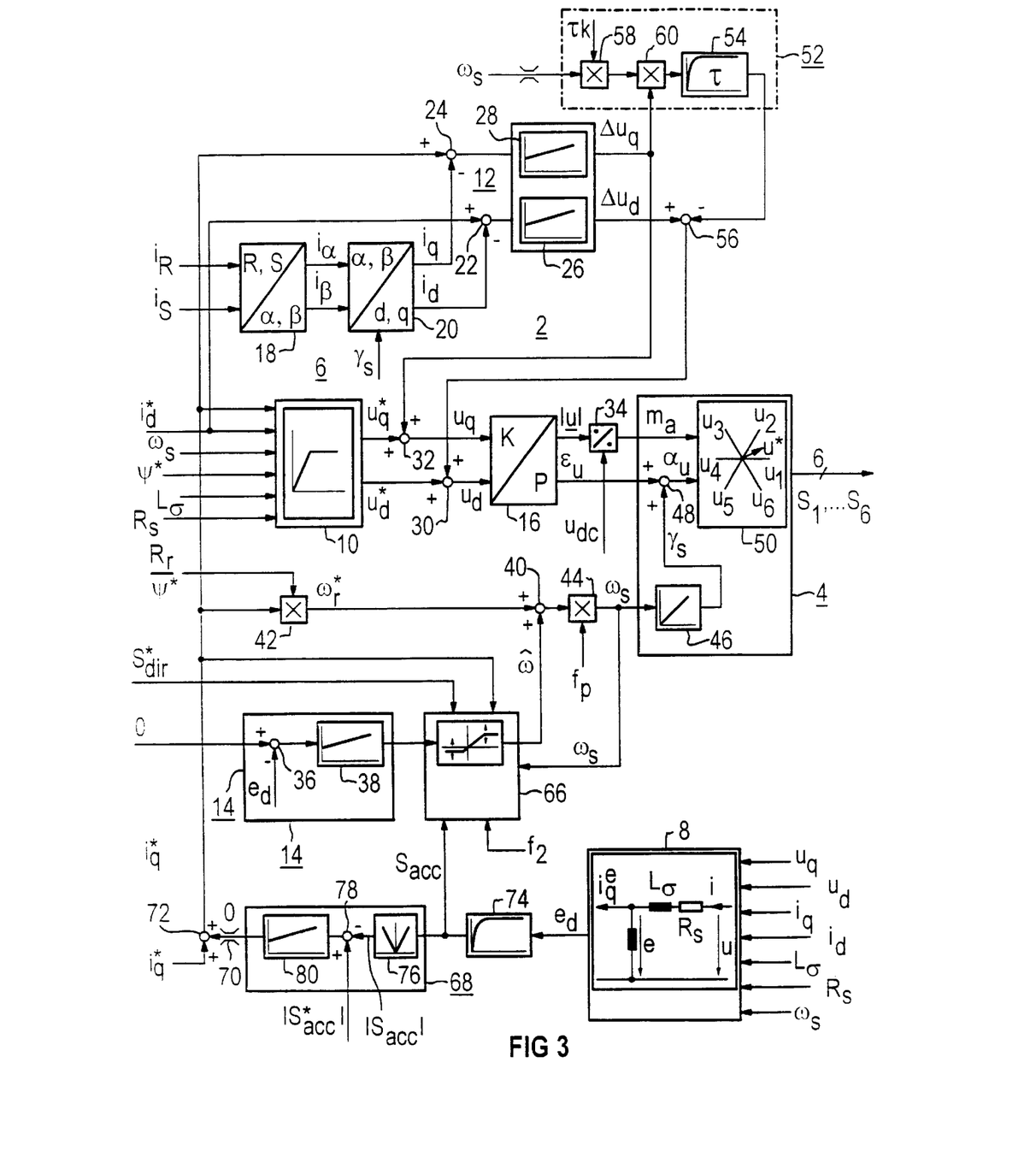
FIG. 3 shows a diagram of a third embodiment of the device to accomplish speed control in accordance with the present invention.
Figure 4:
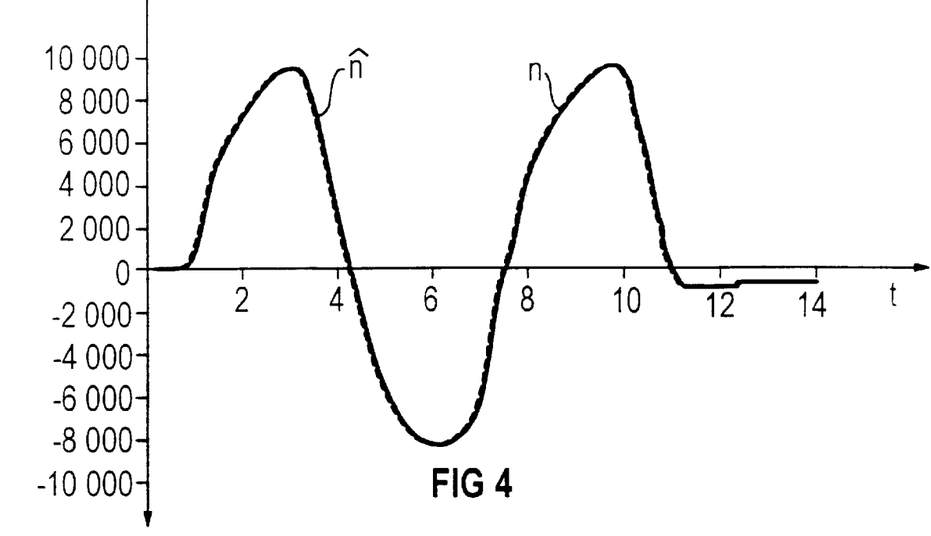
FIG. 4 shows a measured velocity and a calculated model velocity plotted over time t.
Figure 5:
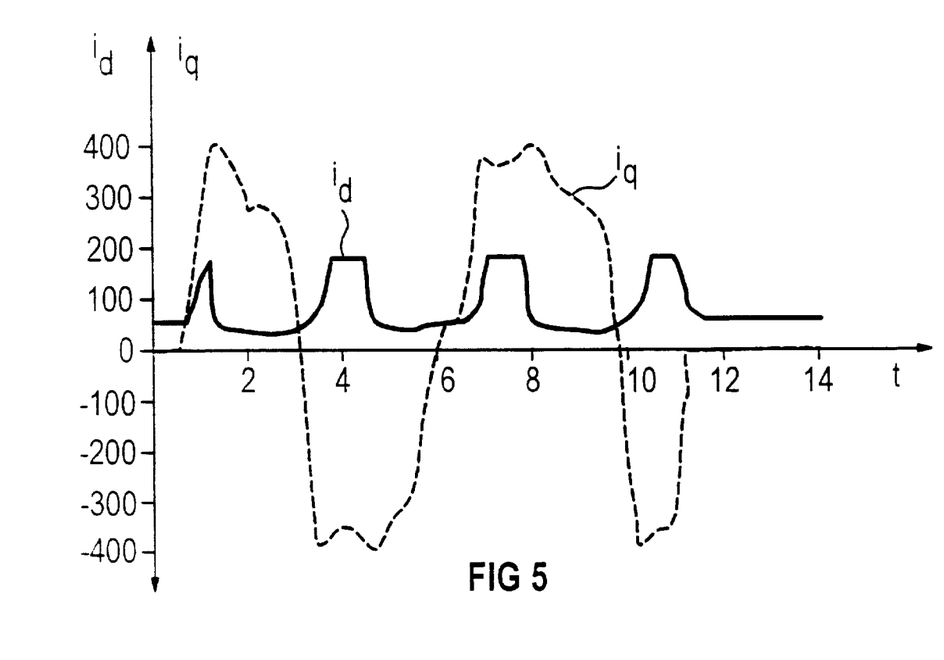
FIG. 5 shows the variation of the torque-forming and flux-forming actual current component of the sensorless, field-oriented asynchronous machine plotted over time t.
Figure 6:
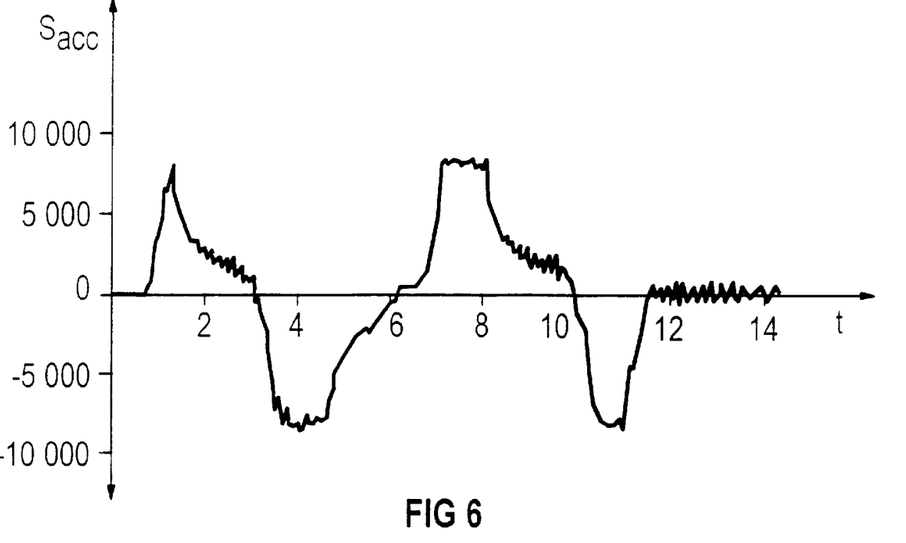
FIG. 6 shows the variation of the actual acceleration plotted over time t.
Figure 7:
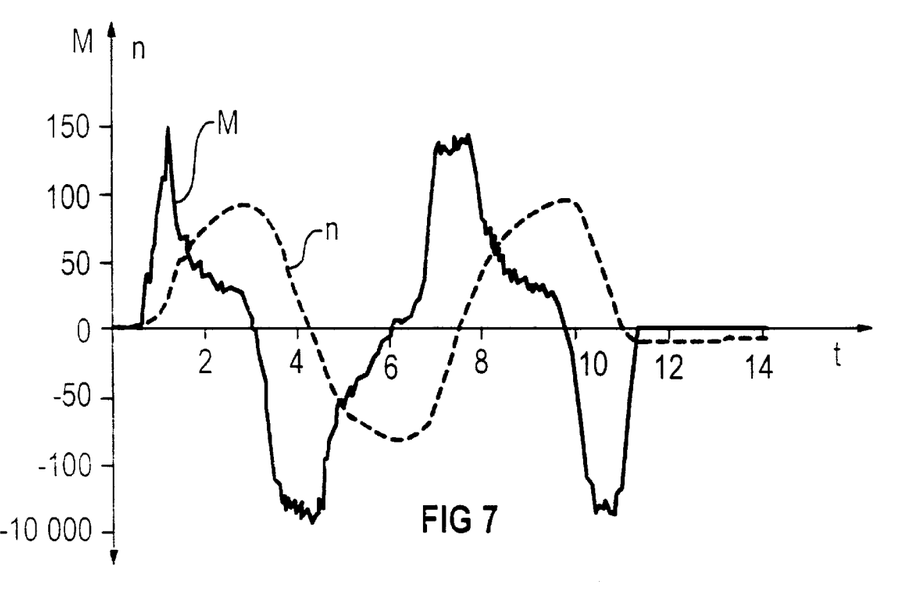
FIG. 7 shows the variation of a calculated torque and a measured speed plotted over time t.

In order to prevent high incorrect orientation of the control system in the event of load change near frequency zero as a result of inadequate dynamics of PI controller 38, device 66 is provided with an actual acceleration value $S_{acc}$ as shown in FIG. 3. FIG. 3 shows an additional advantageous embodiment of the device for carrying out the method of the present invention for controlling a sensorless, field-oriented asynchronous machine. Additionally, this actual acceleration value $S_{acc}$ is supplied to an acceleration control device 68 whose output is coupled with an adder 72 through limiting device 70. The actual acceleration value $S_{acc}$ is determined by a converter 74 from d-component $e_d$ of EMF space vector e.

Acceleration control device 68 features an absolute value former 76, a comparator 78, and a PI controller 80. Absolute value former 76 is arranged at the input and receives at its input the calculated actual acceleration value $S_{acc}$. The output of this absolute value former 76 is connected to an inverting input of comparator 78. At its output, this comparator 78 is connected to the PI controller 80 of acceleration control device 68. The non-inverting input of comparator 78 receives an absolute value $|S^*_{acc}|$ of acceleration limit value $S^*_{acc}$. The output of PI controller 80 is connected to adder 72 through limiting device 70. A torque-forming setpoint current component $i^*_q$ is provided at the second input of adder 72. The output of adder 72 is connected to an input of device 66 and to components 42, 10, and 24 of the field-oriented control system 2.

From the calculated actual acceleration value $S_{acc}$, absolute value $|S_{acc}|$ is formed by absolute value former 76 of acceleration control system 68. This absolute value $|S_{acc}|$ is compared with the absolute value $|S_{acc}|$ of an acceleration limit amount $S^*_{acc}$ by comparator 78. As long as the actual acceleration absolute value $|S_{acc}|$ is less than the acceleration absolute value limit $|S^*_{acc}|$, a positive output voltage of PI controller 80 is not forwarded to adder 72 because of limiting device 70. If the actual acceleration absolute value $|S_{acc}|$ is greater than the acceleration absolute value limit $|S^*_{acc}|$, the torque-forming setpoint current component $i^*_q$ will be reduced until the actual acceleration absolute value $|S_{acc}|$ is equal to the acceleration absolute value limit $|S^*_{acc}|$.

This acceleration controller 68 allows avoidance of gross incorrect orientation of this controller 2 which may arise from inadequate dynamics of PI controller 38 of EMF control system 14 in the event of load shedding.

FIG. 3 also shows that the actual acceleration value $S_{acc}$ and the torque-forming setpoint current component $i^*_q$ are also supplied to device 66 for limitation of output signal $\hat{\omega}$ of PI controller 38 of EMF control system 14. Furthermore, a second limit frequency $f_2$, whose value is greater than that of the first limit frequency $f_1$, is supplied to this device 66.

Since field-oriented controller 2 is based on a microprocessor, components 62, 64, 66, 68, 70, 72, and 74 are also based on microprocessors. This means that the existing software for conventional known field-oriented control system 2 is expanded by at least one additional program. Device 66 includes modules as follows: comparator, device for controlled modification of the estimated value $\hat{\omega}$, and arithmetic unit to accomplish its task of limiting the output signal $\hat{\omega}$ of the EMF control system 14 as a function of input signals $S_{acc}$, $f_2$, and $i^*_q$. The calculated stator frequency $\omega_s$ and the value of the second limit frequency $f_2$ are supplied to the comparator. The output signal from the comparator is supplied to the device for controlled modification of the estimated value $\hat{\omega}$, at whose second input an actual acceleration value $S_{acc}$ is received. The arithmetic unit calculates an actual moment of inertia as a function of the calculated actual acceleration value $S_{acc}(f_2)$ at the time of the second limit frequency $f_2$ and the torque-forming setpoint current component $i^*_q$. This moment of inertia is supplied to the device for controlled modification of the estimated value $\hat{\omega}$. This new actual value for the moment of inertia is then used for the modification of the estimated value $\hat{\omega}$ if setpoint value changes appear in the torque selection during the controlled transition through the speed point zero. These changes in the torque selection can be recalculated into equivalent acceleration values by means of the arithmetic unit.

In the event of a dynamic rotational direction reversal indicated by a change in the sign of the setpoint rotational direction $s^*_{dir}$ as soon as the stator frequency $\omega_s$ drops below the second limiting frequency $f_2$, the actual value of the moments of inertia existing at that time remains constant. The estimated value $\hat{\omega}$ of the EMF control system 14 is controlled as a function of the actual acceleration value $S_{acc}(f_2)$ in such a manner that the zero point is crossed. The limiting side that is opposite this rotational direction is dynamically limited to zero in accordance with the new setpoint rotational direction $S^*_{dir}$.

For example, when a reversing sequence (dynamic rotational direction reversal) occurs at a time when stator frequency $\omega_s$ is greater than the positive value of the limit frequency $f_2$ and the setpoint rotational direction $S^*_{dir}$ is positive, then the setpoint rotational direction $S^*_{dir}$ and the torque-forming setpoint current component $i^*_q$ change their signs. In this manner, the stator frequency $\omega_s$ is reduced together with the actual moment of inertia value and a setpoint torque value. If the stator frequency $\omega_s$ drops below the second limit frequency $f_2$, the instantaneous actual acceleration value $S_{acc}$ remains unchanged. The estimated value $\omega_s$ is so controlled as a function of the actual acceleration value $S_{acc}(f_2)$ that the zero point is crossed. Since the sign of the setpoint rotational direction $S^*_{dir}$ is negative, the negative limit is removed. After the negative value of the limiting frequency $f_2$ has been exceeded, the positive limit is activated.

Since the actual acceleration value $S_{acc}(f_2)$ contains both the information regarding the attrition inertia and the instantaneous torque, and since the inertia is assumed to be constant in the controlled range, no undesired changes in torque occur in this controlled range. Based on this fact, this torque selection may take place in the event of setpoint value changes in the torque selection during the controlled zero point crossing. For this purpose, a value of the acceleration may be calculated as a function of the constant inertia and the new torque with which the estimated value $\hat{\omega}$ can then be modified.

FIGS. 4–7 show various signal curves at startup, reversal, and braking for the sensorless operation of a field-oriented asynchronous machine. The measurements were conducted on a machine with no load and maximum setpoint torque, and therefore show the greatest acceleration that may occur for the motor used.

Using the method according to the present invention and its various advantageous embodiments, it is possible to achieve field-oriented control of the speed of an asynchronous machine without a sensor, which may be gradually slowed down to a standstill and then started up again. Additionally, reversing without undesired changes in torque is also possible.

What is claimed is:

1. A method of controlling a sensorless, field-oriented asynchronous machine, the method comprising the steps of:

generating, with a two-component current control system, a field-oriented manipulated variable space vector;

calculating, with an EMF computer, a d-component of a calculated EMF space vector;

calculating, with an EMF control system including a PI controller, an estimated value of a speed of the field oriented asynchronous machine as a function of the d-component of the calculated EMF space vector;

calculating a stator frequency by adding a calculated slip frequency to the estimated value of the speed of the field oriented asynchronous machine;

deriving a flux angle of the stator frequency;

transforming the field-oriented manipulated variable space vector into a stator-oriented manipulated variable space vector as a function of the flux angle of the stator frequency;

determining a plurality of control signals as a function of the stator-oriented manipulated variable space vector; and deactivating the PI controller of the EMF control system and gradually reducing an output signal of the EMF control system when the stator frequency is less than or equal to a first limit frequency, wherein the first limit frequency is substantially less than a nominal slip of the field-oriented asynchronous machine.

2. The method according to claim 1, the method further comprising the step of:

limiting the output signal of the EMF control system to zero from a first direction when the stator frequency is greater than the first limiting frequency, wherein the first direction is a function of a setpoint rotational direction.

3. The method according to claim 1, the method further comprising the steps of:

determining a calculated deviation of an actual acceleration absolute value from a limit acceleration absolute value;

reducing a torque-forming setpoint current component as a function of the calculated deviation.

4. The method according to claim 1, the method further comprising the steps of:

crossing a speed point zero under control when a setpoint rotational direction is reversed from a second limit frequency, the second limit frequency being greater than the first limit frequency; and changing the estimated value of the speed of the field oriented asynchronous machine as a function of an actual moment of inertia and a setpoint torque value, the actual moment of inertia calculated at the second limit frequency.

5. The method according to claim 4, the method further comprising the steps of:

determining a change in the setpoint torque value;

converting the change in the setpoint torque value into an equivalent actual acceleration value during the crossing of the speed point zero.

6. The method according to claim 3, the method further comprising the step of:

determining the actual acceleration absolute value as a function of the d-component of the calculated EMF space vector.

7. A device for controlling a sensorless, field-oriented asynchronous machine, comprising:

a field-oriented control system including an EMF computer, the EMF computer having a d-component output;

a space vector modulator having a frequency input;

a device for determining a stator frequency of the sensorless, field-oriented asynchronous machine, the device including an EMF control system including a first PI controller, the EMF control system having an input and an output, the input of the EMF control system coupled to the d-component output of the EMF computer;

a multiplier having an input and an output, the input of the multiplier receiving a torque-forming setpoint current component and a quotient of a rotor resistance and a setpoint flux; and an adder having an input, the input of the adder coupled to the output of the EMF control system and to the output of the multiplier, the output of the adder coupled to the frequency input of the space vector modulator; and a first comparator having an input and an output, the input of the first comparator receiving a first limit frequency and the stator frequency, the output of the first comparator coupled to a device for deactivating the first PI controller and for gradually reducing an output signal of the EMF control system to zero.

8. The device according to claim 7, further comprising:

a limiting device coupled to the EMF control system, the limiting device receiving a setpoint rotational direction and limiting the output signal of the EMF control system as a function of an adjustable positive limit value and an adjustable negative limit value.

9. The device according to claim 7, further comprising:

an acceleration control device including an absolute value former having an input, a second comparator having a non-inverting input, and a second PI controller having an output, the absolute value former, the second comparator, and the second PI controller being coupled in series, the input of the absolute value former coupled to the d-component output of the EMF computer via a conversion device, the non-inverting input of the second comparator receiving an acceleration limit absolute value, the output of the second PI controller coupled to an input of an adder via a one-sided limiting device, the input of the adder receiving the torque-forming setpoint current component, an output signal of the adder used by the field-oriented control system and the device for determining the stator frequency as a corrected torque-forming setpoint current component.

10. The device according to claim 8, wherein the limiting device includes a third comparator receiving a second limit frequency and the stator frequency, and a device for providing controlled modification of the output signal of the EMF control system as a function of an actual acceleration value and a comparator signal.

11. The device according to claim 10, wherein the limiting device further includes:

an arithmetic unit receiving the torque-forming setpoint current component and generating an acceleration value, wherein the limiting device provides controlled modification of the output signal of the EMF control system as a function of the acceleration value.

12. The device according to claim 7, wherein the field-oriented control system includes a microprocessor.

* * * * *